Dec. 19, 1967  G. M. ANDERSON ETAL  3,359,494
METHOD OF EXTERNALLY DETERMINING DISCHARGE CAPABILITY
OF A BATTERY WITH A METAL ELECTRODE
Filed Aug. 10, 1964  2 Sheets-Sheet 1
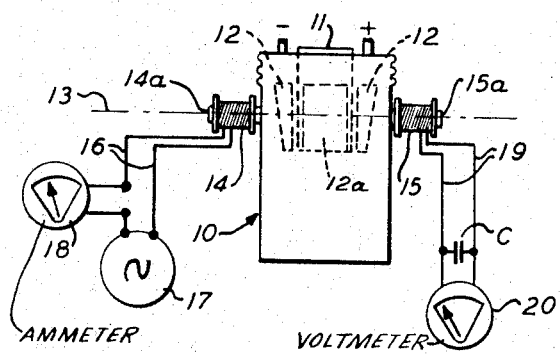
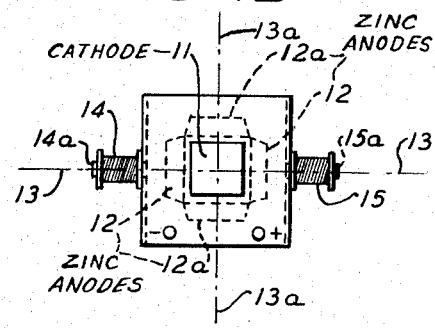
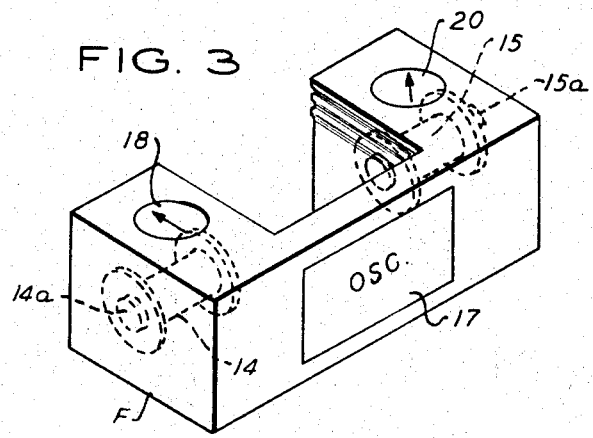
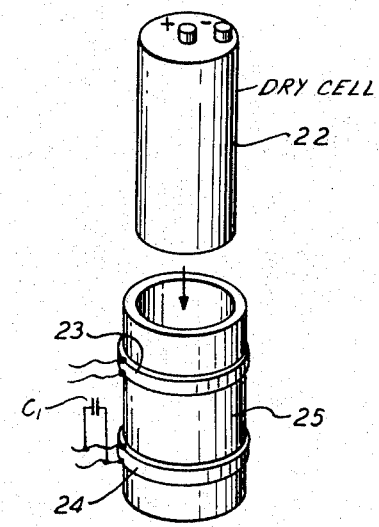
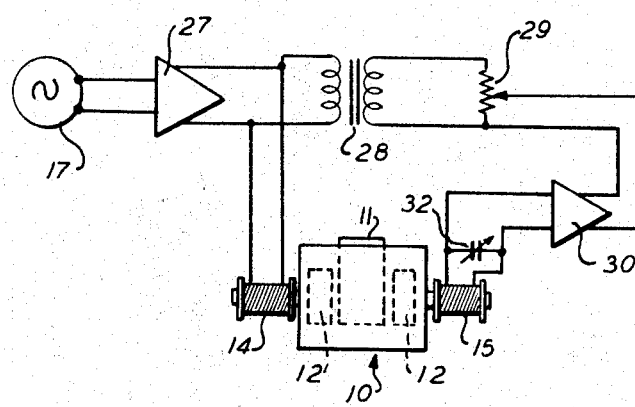
INVENTORS
GEORGE M. ANDERSON
SOL S. JAFFE
MELVILLE D. BOWERS
BY George H. Fritzinger
AGENT

United States Patent Office

3,359,494
Patented Dec. 19, 1967

3,359,494
METHOD OF EXTERNALLY DETERMINING DISCHARGE CAPABILITY OF A BATTERY WITH A METAL ELECTRODE
George M. Anderson, Whippany, Sol S. Jaffe, West Orange, and Melville D. Bowers, Montville, N.J., assignors to McGraw-Edison Company, Elgin, Ill., a corporation of Delaware
Filed Aug. 10, 1964, Ser. No. 388,359
8 Claims. (Cl. 324—29.5)

ABSTRACT OF THE DISCLOSURE

This invention relates to a method of determining the discharge capability of a battery having a metal electrode which is consumed during discharge of the battery. The method involves the measurement of the quantity and condition of the metal electrode of the battery. The measurement is made externally of the battery by a test circuit including primary and secondary coils placed at opposite sides of the battery so that they are inductively coupled through the metal electrode. An alternating current is fed into the primary coil and the voltage induced in the secondary coil is measured. Due to eddy current losses the induced secondary voltage for a given input current varies according to the amount and condition of the metal electrode. The ratio of the induced secondary voltage to the input current is therefore an indication of the discharge capability of the battery.

---

The term "discharge capability" is herein considered to mean the quantity of electricity in ampere hours which the battery is capable of delivering when discharged under specific conditions as to temperature, rate and end voltage.

The invention is particularly applicable to and is herein described in connection with certain primary batteries but without intending any unnecessary limitation thereto.

It is an object of the invention to provide a method and apparatus by which the discharge capability of a battery can be determined by external measurements without making any terminal connections to the battery and without producing any change in the battery.

Another object is to provide a method and apparatus by which the discharge capability of a battery can be under continuous observation either locally or at a remote station without affecting either the life or service of the battery.

Another object of the invention resides in providing such improved method and apparatus which enables the discharge capability of a battery already in service to be determined without interrupting the battery circuit or altering the current drain.

A further object is to provide an economical method and apparatus which enables batteries to be tested for discharge capability in a rapid and reliable manner.

The present method and apparatus depends for its operation on determining the discharge capability of a battery in terms of the amount of metal remaining in the metal electrode. The invention is carried out by using a test circuit which is inductively coupled through the battery in such manner that the coupling coefficient— which becomes a measure of the discharge capability— is dependent through any current losses in the metal electrode upon the quantity, shape and condition of metal in that electrode. The present method is suitable especially with batteries which use one metal electrode and another electrode of a non-metallic character which normally does not deteriorate to the point of affecting the life of the battery. For example, the invention is especially adapted for use in connection with batteries of the air depolarized type employing an air depolarized carbon cathode and a zinc metal anode. The invention is also useful in connection with ordinary Leclanche dry cells and other batteries of both primary and secondary type as will appear.

These and other objects and features of the invention will be apparent from the following description and the appended claims.

In the description of the invention reference is had to the accompanying drawings, of which:

FIGURE 1A is a side elevational view of an air depolarized battery having an air depolarized cathode and a zinc anode dottedly indicated, showing our test apparatus in diagrammatic form applied thereto;

FIGURE 1B is a top plan view of the battery of FIGURE 1A showing the two coils of the test apparatus applied to the battery;

FIGURE 3 is a view of a test apparatus adapted to fit onto the case of the battery of FIGURE 1 for locating the primary and secondary coils in centered relation to the zinc anodes;

FIGURE 4 is a view of an ordinary Leclanche dry cell showing our test apparatus in position to be applied thereto;

FIGURE 6 is a schematic test circuit calibrated to read directly the discharge capability of a battery.

Figure 2:
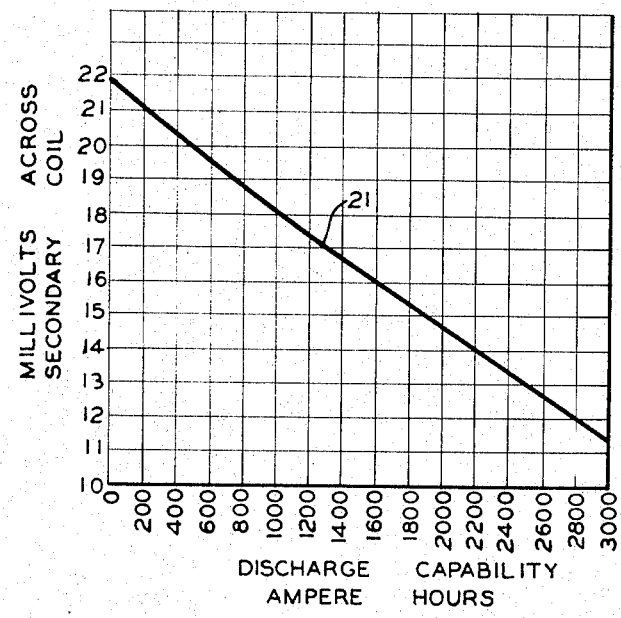
FIGURE 2 is a typical calibration curve of output test voltage versus discharge capability for the battery shown in FIGURE 1.

The battery 10 shown in FIGURES 1A and 1B by way of preferred illustrative example is an air depolarized alkaline electrolyte battery having a centrally disposed air depolarizing cathode 11 extending through the top wall of the case and exposed at its top face to the atmosphere, a pair of zinc anodes 12 of a block or plate-like formation mounted at opposite sides of the cathode in centered relation to a medial line 13, and a second pair of zinc anodes 12a at opposite sides of the cathode in centered relation to a second medial line 13a at right angles to the medial line 13 as is the case, for example, in the Edison Carbonaire type Y cell. Alternatively, one of the pairs of zinc anodes may be eliminated as is shown in the Dunham Patent No. 2,650,947, dated Sept. 1, 1953.

The battery shown in FIGURES 1A and 1B has wide application in the railroad industry in supplying current to the various signalling equipment. These batteries are located in boxes along the railroad tracks and must be checked periodically so that they are replaced in ample time to avoid any signal failures. In testing the batteries for discharge capability it is important to avoid having to interrupt the circuit connections or to alter the load conditions on the battery, so as not to alter or disrupt the operation of the signalling apparatus. The test apparatus shown in FIGURES 1A and 1B comprises a primary coil 14 centered axially on the medial line 13 at one side of the battery case and a secondary coil 15 centered on this same line at the opposite side of the case. The coils are preferably provided with laminated magnetic cores 14a and 15a but the cores preferably are not joined. The primary coil is connected by a lead 16 to an oscillator 17 typically of from 175 to 200 cycles per second. Connected also in the oscillator circuit is an ammeter 18 for measuring the input current $I_1$ to the primary coil. The secondary coil is connected by leads 19 to a voltmeter 20 for measuring the induced voltage $E_2$. The coupling coefficient expressed as the ratio of the induced voltage $E_2$ to the input current $I_1$ is dependent upon the amount of zinc in the zinc anodes and is therefore a measure of the discharge capability of the battery. When the mass of the zinc anodes 12 is large there is a large eddy current loss therein which reduces the electromagnetic coupling to cause the ratio $E_2$ to $I_1$ to be relatively small, and when the zinc anodes have been nearly consumed through discharge of the battery the eddy current loss is very much reduced to cause the ratio of $E_2$ to $I_1$ to be at a maximum—the same as when the coils are air coupled in the spaced relationship which they have when mounted at opposite sides of the battery case. By adjusting the input current always to a fixed predetermined value, the induced voltage itself is a measure of the discharge capacity.

It is preferable that the cores of the primary and secondary coils be not only axially aligned on a medial line through the centers of mass of the metal electrodes but also that the cross sectional areas of the cores be small, say 5% or less, of the cross sectional area of the metal electrodes at right angles to the medial line. The Edison Carbonaire Type Y cell has zinc anodes each with a cross sectional area of approximately 14 sq. in. In FIGURE 2 there is a calibration curve 21 of output voltage $E_2$ vs. ampere hours delivered for this cell determined empirically with the use of primary and secondary coils each of 2300 turns of No. 36 gauge wire wound onto a plastic bobbin into which is inserted a laminated core approximately .16 sq. in. cross section and 1⅝ in. length. In determining the calibration curve 21 each reading is taken when the input current is held to 50 milliamperes, or to an equivalent voltage, and the frequency of the input is 175 c.p.s. To enhance the percentage variation in the output voltage a capacitor C of around 2.2 μfd. is connected across the output circuit. This is a value of capacity which gives a maximum output when the coils are in their relative positions for measuring the capacity of a cell without the cell being present. Thus, when checking any other cell with the use of this calibration curve the input current should be held to this same value and frequency in order to permit a direct reading of the discharge capability in ampere hours from the curve.

In an air depolarized cell having excess electrolyte the discharge capability at any time is proportional to the quantity of metal present at that time in the zinc anode. In an air depolarized cell which has been provided with excess zinc the discharge capability is proportional to the quantity of metal present in the zinc anode over and above the excess with which it has been provided. In either case, the discharge capability is a function of the quantity of zinc present, and the relationship can be established empirically for any given make and model of cell. Experience has shown that reliable indications of the discharge capability of commercial zinc-air depolarized cells can be made within plus or minus 5% accuracy. To carry out the invention it is only necessary that the maintainer place the primary and secondary coils 14 and 15 in position at opposite sides of the battery case, set the input current to 50 milliamperes—the reference current at which the calibration curve 21 was made—read the output voltage $E_2$ and then by reference to the graph 21 read directly the discharge capability in ampere hours of the battery.

When the battery under test has two sets of zinc anodes as is the case with the Edison Carbonaire type Y cell, greater accuracy is obtained by taking a first reading $E_2$ with the coils on the axis 13 and a second reading $E_{2a}$ with the coils on the axis 13a. The average of these two voltage readings is then used with reference to the graph 21 to determine the discharge capability. Alternatively, the graph 21 can be provided wherein the ordinate axis is the sum of the two output voltages $E_2$ and $E_{2a}$ to eliminate the need for determining the average value of the two voltage readings. For the Carbonaire type Y cell an average output voltage of 11.5 millivolts indicates a full charge of 3000 ampere hours and an average output voltage reading of 21.9 millivolts indicates that the battery is fully discharged.

It is very important that all readings be made at the same predetermined frequency of the input voltage. Empirical results from the Edison Carbonaire Type Y cell have shown that the steepest calibration curve 21 for greatest accuracy of measuring the discharge capability of the cell is obtained when the frequency of the input voltage is of the order of 175 to 200 c.p.s. The optimum frequency will differ however with different types if batteries.

The primary and secondary cores may be held in place by hand and be located by bosses or recesses provided in the case of the battery. Alternatively, as shown in FIGURE 3, a frame F of a suitable non-magnetic insulating material, say Lucite (methyl methacrylate), may be of a three-sided construction adapted to be fitted from a sidewise direction onto the case of the battery into a definite position in relation thereto. Mounted on this frame are the primary and secondary coils 14 and 15 located in such position that when the frame is in a fully mounted position on the case the coils will be located axially on the medial line 13 or 13a. Further, this frame may contain the oscillator 17, and the input and output meters 18 and 20 so as to provide a unitary test apparatus, it being understood suitable magnetic shielding is provided between the coils and the respective meters.

Figure 5:
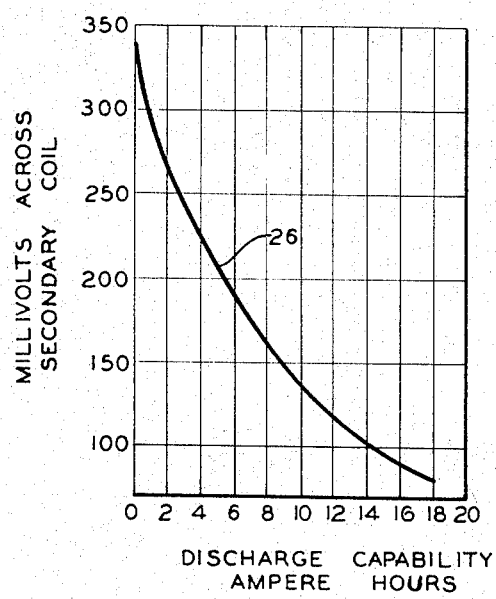
FIGURE 5 is a typical calibration curve of output test voltage versus discharge capability for the battery shown in FIGURE 4.

The ordinary No. 6 dry cell 22 (FIGURE 4) which is of the zinc-manganese dioxide (Leclanche) type, has a discharge capability which is also dependent primarily on the mass of the zinc anode since these batteries are ordinarily provided with sufficient manganese dioxide and/or electrolyte to enable a utilization of the zinc anode to a predetermined point. In these dry cells the zinc anode is a cylindrical shell of relatively small thickness which surrounds or contains the electrolyte and depolarizer together with the central carbon current tap. Cells of this form are tested preferably by placing primary and secondary coils 23 and 24 on a cylindrical shell 25 which can be slid onto the dry cell to place the coils around the upper and lower half portions of the cell as indicated diagrammatically in FIGURE 4. Tests on dry cells of the No. 6 size have shown that the greatest range of induced voltage for maximum accuracy of measurement of the discharge capability is obtained when the input current has a frequency of the order of 3000 c.p.s. Also, to enhance the percentage variation in the output voltage a capacitor $C_1$ of around .025 μfd. is connected across the output circuit. A typical calibration curve for these dry cells, using primary and secondary coils each of 850 turns of No. 40 gauge wire, with an input current of 2 milliamperes, is shown by curve 26 in FIGURE 5.

A known method of directly reading the discharge capability of a battery is shown in FIGURE 6. Here the output of the oscillator 17 is fed through an amplifier 27 to provide 10 volts across the primary coil 14. Also this same voltage is fed through a 1:1 ratio isolation transformer 28 to a variable attenuator 29. The induced voltage in the secondary coil 15 is fed through an amplifier 30. The output of the amplifier 30 and of the attenuator 29 are connected in series with a vacuum tube voltmeter 31. By adjusting a variable condenser 32 across the secondary coil 15, the output voltage $E_2$ is brought to an out-of-phase relationship to the voltage from the attenuator 29 and by properly adjusting the attenuator 29 a null reading is obtained in the voltmeter. The setting of the attenuator is an indication of the discharge capability of the battery.

In cells having a known excess of zinc, if the zinc anode should undergo open-circuit corrosion the present invention gives a measurement of allowable discharge capability rather than of discharge capability. By allowable discharge capability is meant the quantity of charge which when taken out of the cell will just bring the quantity of zinc down to the predetermined minimum equal to the known excess of zinc originally provided. The allowable discharge capability is an important quantity especially for the ordinary dry cell, where the zinc is not only the anode material but also an important structural member serving as the cell container. Such a cell should not be permitted to discharge beyond its allowable discharge capability because it would invite the risk of can perforation and leakage. It should be noted that allowable discharge capability can also be defined on the basis of the minimum quantity of zinc known from experience to be required for protection from can perforation and leakage. Such quantity of zinc can be established as a norm for all dry cells of a given size or shape regardless of the amount of zinc present initially.

From the foregoing description, it will be apparent that the present invention is useful in measuring externally the discharge capability or allowable discharge capability having one metal electrode which is consumed as the battery is discharged since the discharge capability or allowable discharge capability of such batteries is dependent primarily on the quantity of metal in that electrode. Other type cells than those hereinabove particularly described whose discharge capability or allowable discharge capability may be measured by the present invention are magnesium cells made with manganese dioxide or organic depolarizers, zinc-alkaline manganese dioxide cells, etc. Also, certain secondary cells within the limitations here described may be measured by the present invention. The term "battery" as herein used is meant to comprehend one or more cells except when otherwise indicated. The term "electrical input" and "electrical output" is used to mean respectively the input voltage or current and the output voltage or current.

The embodiments of our invention herein particularly shown and described are intended to be illustrative and not necessarily limitative of our invention since the same are subject to changes and modifications without departure from the scope of our invention, which we endeavor to express according to the following claims.

We claim:

1. The method of determining the discharge capability of a battery having a metal electrode which is consumed in proportion to the ampere hours discharged from the battery, which comprises placing a primary coil and a secondary coil in juxtaposition to the battery whereby the electromagnetic coupling field between the coils traverses said metal electrode, connecting an A.C. source of input current of a predetermined frequency to said primary coil, measuring the induced voltage in said secondary coil, and determining the discharge capability of the battery from the ratio of the induced voltage to the input current.

2. The method of determining the discharge capability of a battery having a metal electrode which is consumed in proportion to the ampere hours discharged from the battery, which comprises placing a primary coil and a secondary coil in juxtaposition to the battery whereby the electromagnetic coupling field between the coils traverses said metal electrode, connecting an A.C. source of input current of a predetermined frequency and a predetermined value to said primary coil, and measuring the induced voltage in said secondary coil to determine the discharge capability of the battery in terms of the variable effect of said metal electrode on the electromagnetic coupling between said coils as said metal electrode is consumed.

3. The method of determining the discharge capability of a battery having a metal electrode which is consumed in proportion to the ampere hours discharged from the battery, which comprises placing primary and secondary coils at opposite sides of the battery whereby the electromagnetic coupling field between the coils traverses said metal electrode, preparing a calibration curve for said type of battery of discharge capability vs. the ratio of the induced electrical output in said secondary coil to the electrical input to said primary coil, measuring said electrical input and said electrical output for the battery under test, and reading the discharge capability of the battery under test from said calibration curve using the ratio of said measured electrical output to said electrical input.

4. The method set forth in claim 3 wherein said calibration curve is prepared on the basis of a fixed input current being supplied to said primary coil whereby the induced secondary voltage is a measure of the ratio of said induced electrical output to said electrical input, and reading the secondary induced voltage for the battery under test when the input current is at said fixed value to determine the discharge capability of the battery by reference to said calibration curve.

5. The method set forth in claim 3 wherein said battery has two sets of metal anodes respectively positioned at right angles to each other, wherein two measurements of induced voltage are made on said battery respectively with said coils axially aligned at right angles to the first and to the second sets of said metal anodes, and wherein the average of said two measurements of induced voltage are applied to said calibration curve to determine the discharge capability of the battery.

6. The method of determining the discharge capability of an air depolarized primary battery having a zinc anode which is consumed in proportion to the current discharge from the battery comprising placing a primary coil against one side of said battery with the axis of the coil at right angles to said zinc anode, placing a secondary coil at an opposite side of said battery in coaxial relation to said primary coil, applying an A.C. voltage of predetermined frequency across said primary coil, measuring the input current to said primary coil and the induced voltage in said secondary coil, and comparing said induced voltage and said input current to determine the discharge capability of said battery.

7. The method set forth in claim 6 wherein said primary and secondary coils are provided with laminated magnetic cores of a cross-sectional area which is a minor fraction of the cross-sectional area of said zinc anode in a plane at right angles to said axis.

8. The method of determining the discharge capability of a cylindrically-shaped dry cell of the zinc-manganese dioxide type which comprises placing primary and secondary coils around respective end portions of said cell, feeding an A.C. input voltage of a predetermined frequency to said primary coil, measuring the input current and induced voltage in said respective coils, and comparing said induced voltage and said input current to determine the discharge capability of the cell in relation to a standard calibration curve of measured ratio of induced voltage to input current vs. discharge capability for said type of cell.

References Cited

UNITED STATES PATENTS 2,057,835  10/1936  Karajan et al. _____ 324—40
2,155,267  4/1939   Hathaway _____ 324—40

RUDOLPH V. ROLINEC, *Primary Examiner.*

C. F. ROBERTS, *Assistant Examiner.*